United States Patent [19]

Billings et al.

[11] 4,253,428

[45] Mar. 3, 1981

[54] HYDROGEN FUEL SYSTEMS

[76] Inventors: Roger E. Billings, 865 N. 1250 West, Provo, Utah 84601; Ronald L. Woolley, 427 E. 1070 South; Vaughn R. Anderson, 217 N. 260 West, both of Orem, Utah 84057

[21] Appl. No.: 974,325

[22] Filed: Dec. 29, 1978

[51] Int. Cl.³ .............................................. F02B 43/08
[52] U.S. Cl. .................. 123/1 A; 123/25 B; 123/575; 123/DIG. 12; 123/3
[58] Field of Search ................. 123/1 A, 3, 127, 25 B, 123/DIG. 12; 165/52; 60/39.46 R, 39.46 P, 39.46 G

[56] References Cited

U.S. PATENT DOCUMENTS

| | | | |
|---|---|---|---|
| 3,044,453 | 7/1962 | Hoffmann | 123/25 B |
| 3,963,000 | 6/1976 | Kosaka et al. | 123/1 A |
| 3,983,882 | 10/1976 | Billings | 123/DIG. 12 |
| 4,011,840 | 3/1977 | Forster | 123/3 |
| 4,016,836 | 4/1977 | MacKay et al. | 123/3 |
| 4,167,165 | 9/1979 | Finlay et al. | 165/52 |

*Primary Examiner*—Craig R. Feinberg

*Attorney, Agent, or Firm*—Thorpe, North, Western & Gold

[57] ABSTRACT

A hydrogen fuel system for use in conjunction with and as an alternative to a hydrocarbon fuel system in a motor vehicle or other apparatus having a combustion unit and a mixing device for mixing hydrogen gas with air for introduction into the combustion unit. The hydrogen fuel system includes a hydrogen storage tank for holding hydrogen under pressure, a conduit for conveying hydrogen gas from the tank to the mixing unit, and a solenoid disposed in the conduit and responsive to a first signal for allowing the flow of hydrogen gas to the mixing unit, and responsive to a second signal for preventing flow of hydrogen gas to the mixing unit. Also included is a hydrocarbon fuel tank, a conduit for conveying fuel from the fuel tank to the combustion unit, and a fuel pump responsive to the first signal for preventing flow of fuel from the fuel tank to the combustion unit, and responsive to the second signal for pumping fuel to the combustion unit. A two-position, manually operable switch is provided to produce the first signal when in a first setting and the second signal when in a second setting.

5 Claims, 2 Drawing Figures

HYDROGEN FUEL SYSTEMS

BACKGROUND OF THE INVENTION

This invention relates to methods and systems for powering combustion apparatus with hydrogen.

As a result of recent shortages in hydrocarbon fuels and the recognition that the supply of such fuels will ultimately be exhausted, there has been an increased interest in finding and developing alternative fuels. One alternative fuel whose potential has long been recognized but, as yet, has not been fully realized is hydrogen. The attractiveness of hydrogen as a fuel lies in the fact that it is one of the most abundant of all elements, that conventional internal combustion engines can be readily adapted to operate on hydrogen and in such operation, unlike gasoline, a large percentage of the hydrogen is converted to power the engines, and that the burning of hydrogen in such engines can be made to be relatively pollution free. See, for example, U.S. Pat. Nos. 3,983,882 and 4,016,836. Of course, the potential of hydrogen as a fuel is not limited to internal combustion engines but also extends to industrial use, use in fuel cells and in home and mobile home heaters, and to any situation where natural gas, propane gas, etc., is presently used.

One of the problems which has thus far prevented the widespread use of hydrogen as a fuel has been the difficulty in efficiently and safely storing the hydrogen. Storing hydrogen as a liquid is costly since it requires considerable energy to liquify the hydrogen, and transfer of the liquid from one container to another results in a loss to the atmosphere of much of the hydrogen. Also, containers for the liquid hydrogen must be extremely well insulated to reduce the loss of hydrogen due to vaporization or boiling. Storing hydrogen as a gas requires extremely heavy and bulky containers and is impractical for most presently contemplated consumer uses.

The use of hydride material (hereinafter defined to mean any metals, metal compounds or other materials capable of absorbing or adsorbing and holding hydrogen) appears to be an attractive approach to the storage of hydrogen for consumer purposes. Exemplary hydride material includes iron titanium, misch-metal tetranickel, and columbium. Storage of hydrogen in the hydride material (sometimes referred to as hydriding the material) typically involves lowering the temperature of the hydride material and then applying hydrogen gas under pressure to the material. After the hydride material absorbs the hydrogen, the material is sealed in a container under pressure to maintain the material in the hydrided state until the hydrogen is needed at a subsequent time. Recovery or withdrawal of the hydrogen involves a process substantially opposite that used for storing the hydrogen, i.e., heating the hydride material and releasing some of the pressure of the container in which the hydride material is maintained.

As was discussed in U.S. Pat. No. 4,016,836, heat sources such as exhaust gases and engine coolant are present on most conventional internal combustion engines and so can be adapted to provide the heat necessary to heat the hydride material for hydrogen recovery. Utilizing, or even eliminating, existing accessory systems of a conventional internal combustion engine, of course, would provide significant cost savings.

Although use of hydrogen as the sole source of power is desirable in many instances for the reasons outlined above, there may be circumstances where it would be desirable to also have the capabilities provided by the use of hydrocarbon fuel as the source of power—for example, as an alternate fuel backup system, for operation in a region located a substantial distance from a hydrogen refueling depot, for extended range capability, when operating in areas which permit automotive exhaust pollution well in excess of the levels produced by hydrogen combustion, when one or the other fuel is less expensive, and when a higher power level is required.

SUMMARY OF THE INVENTION

It is an object of the invention to provide a fuel system for a combustion engine in which either hydrogen gas or hydrocarbon fuel may be used to power the engine.

It is another object of the invention to provide a hydrogen fuel system which utilizes hydride tanks for storage of hydrogen, where such tanks serve to cool the coolant circulated through an engine.

It is a further object of the invention to provide a hydrogen fuel system which utilizes hydride tanks for storage of hydrogen, where a heat exchanger supplies a heat exchange medium, heated by exhaust gases from an engine, to heat the hydride material in the tank, and where the heat exchanger includes baffling structure to muffle exhaust noise from the engine.

The above and other objects of the invention are realized in a specific illustrative embodiment of a hydrogen/hydrocarbon fuel system for supplying either hydrogen or hydrocarbon fuel to the combustion unit of an engine. Manually operable control apparatus enables either supplying hydrogen gas and inhibiting supply of hydrocarbon fuel to the combustion unit, or supplying hydrocarbon fuel and inhibiting supply of hydrogen gas to the combustion unit.

In accordance with one aspect of the invention, a hydride tank is provided for storing hydrogen. Coolant from an engine is supplied to the hydride tank to heat hydride material contained therein to thus cause release of hydrogen from the material. Heating of the hydride material causes a cooling of the coolant which is then returned to the engine to cool the engine.

In accordance with still another aspect of the invention, a heat exchanger which includes baffling structure is provided in place of the muffler of a combustion engine. A heat exchange medium circulates through the heat exchanger where it is heated by exhaust gases from the combustion engine; and then the heat exchange medium is supplied to a hydride storage tank for heating hydride material to cause release of hydrogen for delivery to the combustion engine. The heat exchanger thus serves as the muffler for the engine and also as the heat source for heat exchange medium.

BRIEF DESCRIPTION OF THE DRAWINGS

The above and other objects, features and advantages of the present invention will become apparent from a consideration of the following detailed description presented in connection with the accompanying drawings in which.

DETAILED DESCRIPTION

The hydrogen fuel systems and methods of the present invention can be utilized with a variety of systems and apparatus which employ combustion units such as combustion engine powered electrical generators, fuel cells, internal combustion engine powered motor vehicles, etc. For purposes of illustrating the invention, however, the invention will be described as it might be used with a motor vehicle powered by a fuel injection internal combustion engine (FIG. 1), and a motor vehicle powered by any type of internal combustion engine whether air-cooled or water-cooled (FIG. 2).

Figure 1:
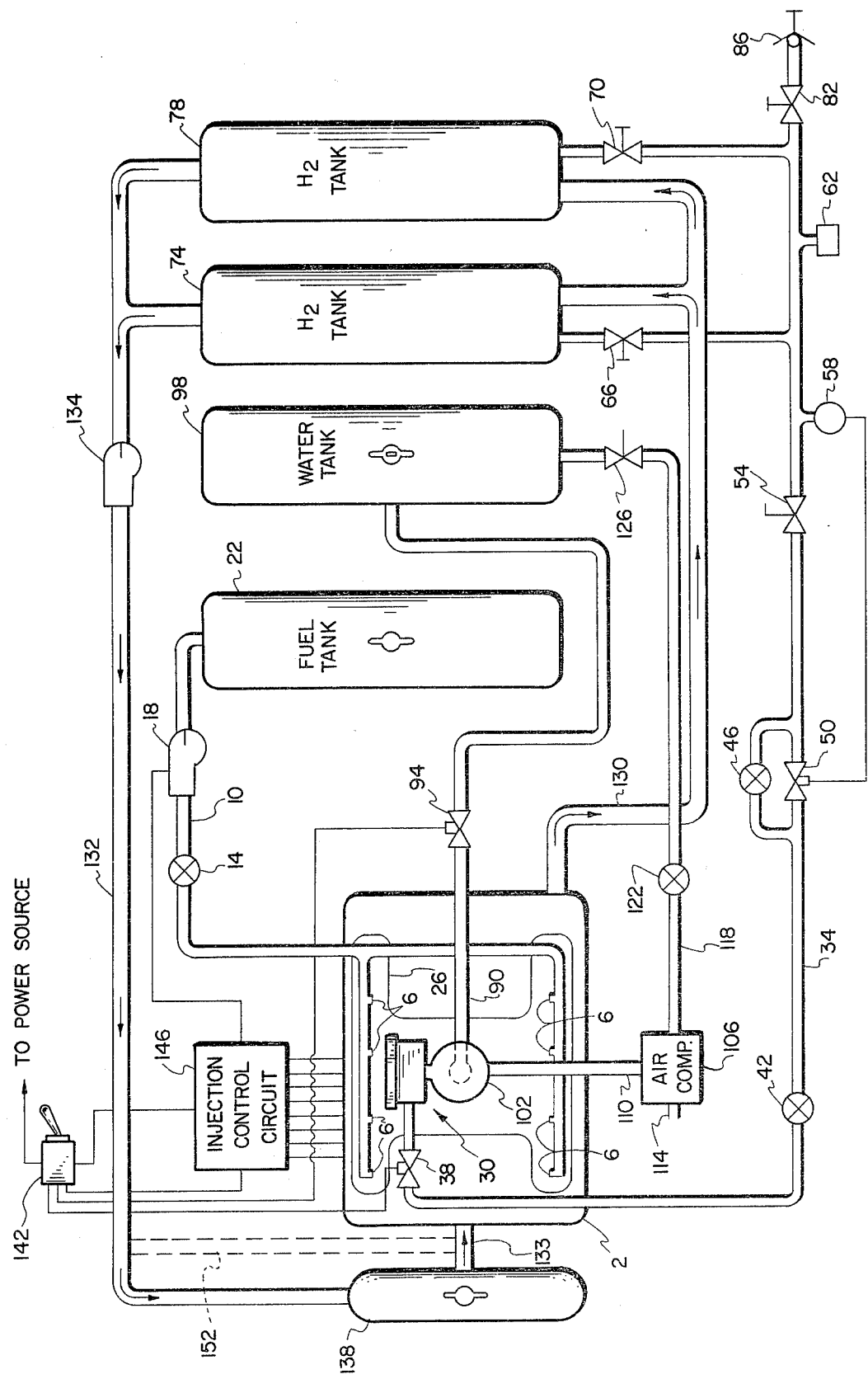
FIG. 1 shows a schematic view of one illustrative embodiment of a hydrogen fuel system made in accordance with the principles of the present invention for use with an internal combustion engine.
Figure 2:
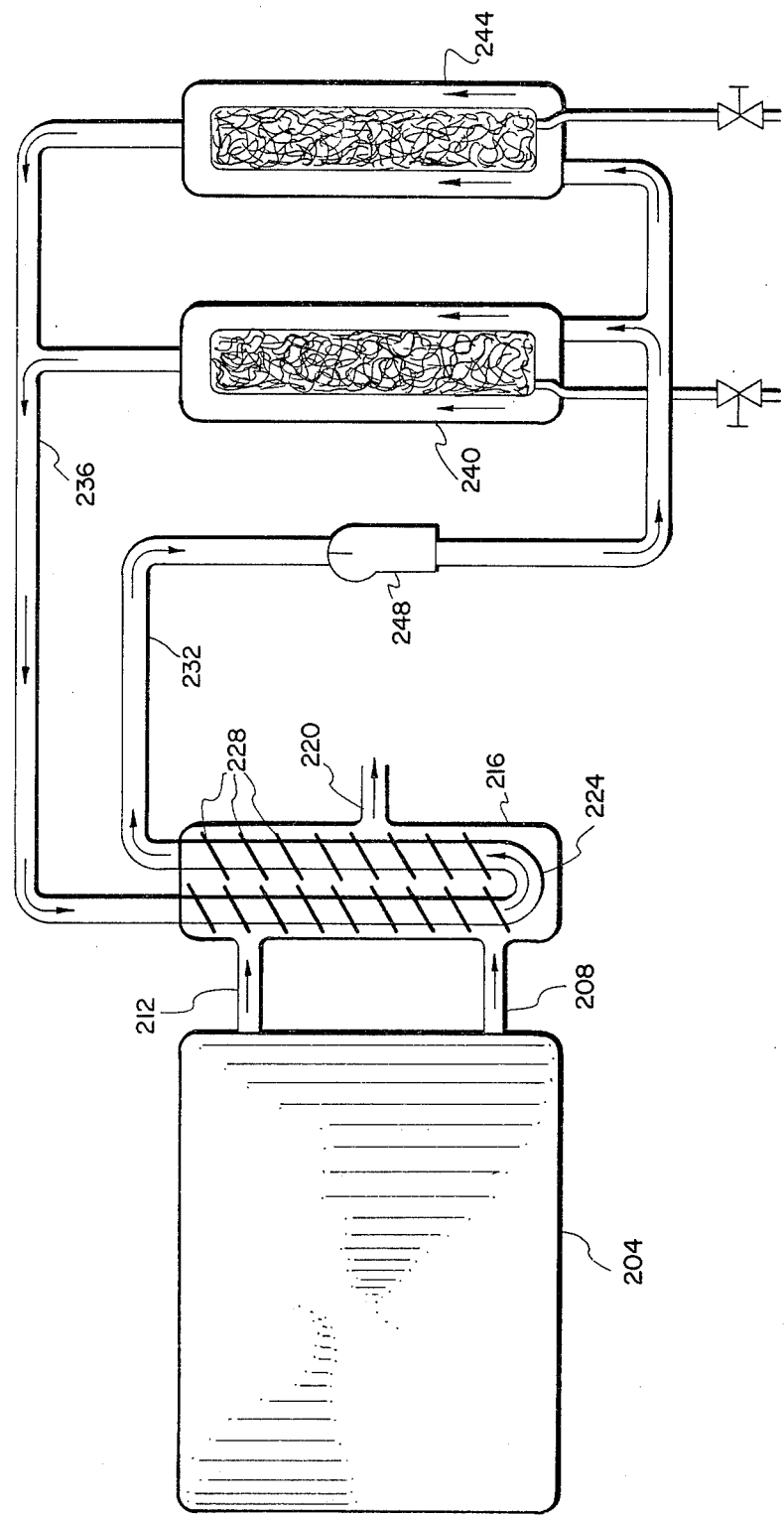
FIG. 2 shows a schematic view of another embodiment of a hydrogen fuel system for use with an internal combustion engine.

In FIG. 1, there is shown a conventional fuel injection internal combustion engine 2 used to power motor vehicles. Included on the engine are eight fuel injectors 6 coupled to a fuel line 10 which leads via a conventional pressure regulator 14 and a fuel pump 18 to a fuel tank 22. The fuel injectors 6 deliver hydrocarbon fuel to an intake manifold 26 which then delivers the fuel to cylinders of the engine 2. A conventional variation of the fuel supply system shown in FIG. 1 is use of a carburetor rather than the fuel injectors.

A mixer 30, such as the hydrogen mixer produced by IMPCO of Cerritos, California, is coupled to the intake manifold 26 in the same manner in which a conventional carburetor would be coupled to a fuel injection system engine. For a carbureted engine, the hydrogen mixer is coupled to the gasoline carburetor downstream of the air cleaner such that intake air passes through both the carburetor and mixers in series. This mixer provides for mixing hydrogen gas received via a fuel line 34 with air for ultimate introduction into the intake manifold. A solenoid 38 is connected in the line 34 to control the flow of hydrogen gas to the mixer unit 30. A low pressure regulator 42 is also coupled into the line 34 in series with a parallel arrangement of a high pressure regulator 46 and a solenoid 50. A manually operable solenoid 54 is also connected in the line 34 along with a pressure transducer 58 and a pressure release valve 62. The fuel line 34 is then coupled via manually operable solenoids 66 and 70 respectively into hydride storage tanks 74 and 78. The construction of such tanks has been discussed in prior patents and applications including U.S. Pat. No. 4,016,836 and U.S. Patent application, Ser. No. 883,905. The hydride storage tank 74 and 78 are adapted to hold hydride material therein and to enable the circulation of a heat exchange medium (to be discussed momentarily) in proximity with the hydride material to heat the material and cause it to release hydrogen gas. FIG. 2 shows a cross-sectional view of a pair of hydride tanks.

Finally, the line 34 is connected via another manually operable solenoid 82 to a quick-connect coupling 86 which allows coupling the line 34 to a source of hydrogen.

The mixer 30 is also coupled to a water line 90 which is coupled via a solenoid 94 to a water tank 98. A water spray nozzle 102 is shown in dotted line in FIG. 1 connected to the end of a water line 90. The water tank 98 is pressurized by the standard air compressor 106 which is included with conventional internal combustion engines and which is powered by the vacuum created in the air introduction passage below the carburetor of the conventional engine. This passage in the engine of FIG. 1 connects to the intake manifold 26 in the mixer 30, and a conventional vacuum line 110 connects this passage to the air compressor 106. The vacuum created in the vacuum line 110 causes air to be drawn into the air compressor 106 through an intake opening 114 to thus power the air compressor causing it to apply air pressure to pressure line 118. A conventional air pressure regulator 122 is disposed in the line to maintain the pressure to the water tank 98 substantially constant. A manually operable solenoid 126 is coupled between the regulator 122 and the water tank 98.

A heat exchange medium is applied to the hydride tank 74 and 78 via a conduit 130 from the cooling system of the engine 2. Such heat exchange medium may be the conventional coolant used in an internal combustion engine. The heat exchange medium flows through the hydride tank 74 and 78 and via a pump 134 to a conventional radiator 138. From there the heat exchange medium flows back into the cooling system of the engine 2.

The solenoids 38 and 94, fuel pump 18, and fuel injectors 6 are all controlled by a manually operable two-position switch 142. The switch 142 controls the fuel injectors 6 by an injection control circuit 146. When the switch 142 is in a first position, power from a power source is supplied by the switch to the solenoid 38, to cause the solenoid to open and allow the flow of hydrogen gas to the mixer 30, and to the solenoid 94, to cause that solenoid to open and allow the flow of water also to the nozzle 102. In the first setting, the injection control circuit 146 is caused to prevent the flow of current to the fuel pump 18 so that fuel is not allowed to flow from the fuel tank 22 to the injector 6, and no current is allowed to activate the injectors 6 to inject fuel into the intake manifold 26. The injector control circuit 146 is a conventional control circuit which controls the sequence in which fuel injectors are activated. Thus, when the switch 142 is in the first position, only hydrogen gas and water are supplied to the engine 2 and the engine is operated with hydrogen gas only. Supply of water in conjunction with the hydrogen gas aids in eliminating backfire, reducing the production of nitrogen oxides, etc., as discussed in U.S. Pat. No. 3,983,882.

When the switch 142 is in a second position, the solenoids 38 and 94 are caused to close and respectively prevent the flow of hydrogen gas to the mixer 30 and the flow of water to the nozzle 102. Also, the injection control circuit 146 is signaled to apply current to the fuel pump 18, and to activate the fuel injectors 6 so that conventional hydrocarbon fuel is supplied to the engine 2 to power the engine.

In the manner described, either hydrogen gas or hydrocarbon fuel can be used to power the engine and this may be desirable if for example one type of fuel is more available than another, or one type of fuel is more efficient for certain kinds of driving than another. In either case, the user can simply select which type of fuel he desires to use.

The hydride storage tanks 74 and 78 are charged with hydrogen simply by connecting the coupler 86 to a hydrogen source (not shown), closing solenoid 54 and opening solenoids 82, 66 and 70. Hydrogen is then applied to the hydride storage tanks under pressure. To further facilitate the absorption of hydrogen by the hydride material, a cool heat exchange medium may be circulated through the tanks. After the hydride tanks are filled, the solenoid 82 is closed, and solenoids 54, 66 and 70 are opened. Hydrogen may then be supplied via the fuel line 34 to power the engine 2.

The pressure release valve 62 is provided to release hydrogen when the pressure in the tanks exceeds a certain level to thus avoid a blowout of the tanks. The pressure transducer 58 monitors the pressure in the tanks 74 and 78 and, when the pressure is above a certain level, the transducer causes the solenoid 50 to close so that hydrogen flows via the high pressure regulator 46 to the engine 2. High pressure regulators are designed to withstand high pressures and because of this they generally have small orifices so that flow through such regulators is quite low. Thus, during start up of the engine 2 when the pressure from the tank 74 and 78 is quite high, it is desirable to direct the flow of hydrogen from the tanks through the high pressure regulator 46. After the engine 2 has operated for awhile, the pressure from the tanks will begin to fall and when the pressure falls below a certain level, this is detected by the pressure transducer 58 which causes the solenoid 50 to open. Hydrogen then flows primarily via the solenoid 50 through the low pressure regulator 42 to the mixer 30. Low pressure regulators are designed for low pressure lines but allow a relatively high volume flow. Thus, when the pressure in the line 34 falls below a certain level and more hydrogen gas is needed by the engine 2, the high pressure regulator 46 is effectively removed from the line and the low pressure regulator 42 controls the pressure in the line.

As previously mentioned, it is desirable to supply water spray along with hydrogen gas to the combustion chambers to prevent backfire (flashback), etc. For this reason, the water tank 98 is provided to supply water to the engine 2 when the engine is operating on hydrogen gas. The water tank 98 is maintained under a substantially constant pressure by the air compressor 106 which is standard equipment for many internal combustion engines. Utilization of the air compressor 106 eliminates the need for a water pump in line 90 and thus affords a cost reduction in providing the water injection system. By maintaining a certain pressure in the water tank 98, water is supplied via water line 90 to the mixer 30 where it is sprayed into the passageway joining the mixer 30 to the intake manifold 26.

For an engine powered strictly by hydrogen gas, it is possible to eliminate the radiator 138 and utilize the heat withdrawing capabilities of the hydride storage tanks 74 and 78 to cool the engine. In such a case, the heat exchange medium or conduit 132 is simply connected directly to the coolant intake 133 of the engine 2 to bypass the radiator 138. This is shown by dotted line 152. In operation, heat exchange medium or coolant flows through the engine where it absorbs heat from the engine thus cooling the engine. The coolant then flows to the hydride storage tanks 74 and 78 where the tanks withdraw heat from the coolant in the process of releasing hydrogen. The coolant is then supplied via the conduit 132 back to the cooling system of the engine 2. The size of the hydride storage tanks 74 and 78 would be selected for a particular engine to be sufficient so that when the engine is operating, the tanks would withdraw enough heat from the coolant circulating through the engine to maintain the temperature of the coolant at a desired level while also maintaining the hydrogen pressure in the tanks at a sufficient level to maintain the supply of hydrogen gas to the engine. Of course, since cooling of the engine depends on the release and use of hydrogen, this arrangement of not using the radiator 138 only applies to strictly hydrogen fueled and not the alternative hydrogen/hydrocarbon fueled engines.

FIG. 2 shows an alternative embodiment of a hydrogen fuel system which includes a conventional internal combustion engine 204 having exhaust ports 208 and 212. A housing 216 is coupled to the exhaust ports so that exhaust from the engine 204 flows into the housing and then out a housing exhaust port 220. A conduit 224 is disposed within the housing and includes a plurality of baffles or ribs 228 mounted on the exterior of the conduit.

The conduit 224 is connected by exterior conduits 232 and 236 to a pair of hydride storage tanks 240 and 244. The hydride tanks, as earlier discussed, hold a hydride material for storing hydrogen. A pump 248 is disposed in conduit 232 to cause a heat exchange medium contained in the conduits to flow through the hydride tanks 240 and 244, via the conduit 236 to the conduit 224 disposed in the housing 216. The flow of the heat exchange medium, which could be a conventional engine coolant, is indicated by the arrows. As the coolant flows through the conduit 224, it is heated by the exhaust gases coming from the engine 204 and then the heat exchange medium is pumped to the hydride storage tanks 240 and 244 to heat the hydride material and cause release of hydrogen. The hydrogen is then supplied to the engine 204 in the manner shown in FIG. 1.

The combination of the housing 216 and conduit 224 serves as a heat exchanger and, with the addition of the baffles or plates 228, also serves as a muffler to muffle the exhaust noise of the engine 204. The conventional muffler of a motor vehicle can thus be eliminated with the arrangement of FIG. 2. This arrangement is simple in construction and serves the described dual function for internal combustion engines. Also, since hot exhaust gases are not applied directly to the hydride tanks 240 and 244, less heat resistant materials may be used in the construction of the tanks such as aluminum.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A hydrogen/hydrocarbon fuel system for supplying either hydrogen gas or a hydrocarbon fuel to an engine which includes a combustion unit, an intake manifold for supplying received fuels to the combustion unit, a mixing unit for mixing hydrogen gas with air for delivery to the intake manifold, and a hydrocarbon fuel delivery system for delivering hydrocarbon fuel to the intake manifold, said hydrogen/hydrocarbon fuel system comprising:

means for containing hydrogen,
first conveying means for conveying hydrogen gas from said containing means to said mixing unit,
first control means for controlling the flow of hydrogen gas in said first conveying means,
means for containing hydrocarbon fuel,
second conveying means for conveying fuel from said hydrocarbon containing means to said hydrocarbon fuel delivery system.
second control means for controlling the flow of hydrocarbon fuel in said second conveying means,
means for containing water, means for conveying water from said water containing means to the intake manifold, third control means for allowing the flow of water in said water conveying means, air compressor means coupled to said water containing means by a conduit for creating a pressure within said water containing means, said pressure causing water to flow from said water containing means to the intake manifold through said water conveying means, and manually operable temperature independent two-position switch means responsive to a first switch setting for signaling said first control means to allow the flow of hydrogen gas, for signaling said second control means to prevent the flow of hydrocarbon fuel, and for signaling said third control means to allow the flow of water, and responsive to a second switch setting for signaling said first control means to prevent the flow of hydrogen gas, for signaling said second control means to allow the flow of hydrocarbon fuel, and for signaling said third control means to prevent the flow of water.

2. A hydrogen/hydrocarbon fuel system as in claim 1 further including a pressure regulator disposed in said conduit to maintain the pressure in said water containing means substantially constant.

3. A hydrogen/hydrocarbon fuel system as in claim 1 further comprising a low pressure regulator disposed in said first conveying means, a high pressure regulator disposed in said first conveying means in series with said low pressure regulator, solenoid means disposed in said first conveying means in parallel with said high pressure regulator and responsive to a first signal for assuming a closed condition, and responsive to a second signal for assuming an open condition, and pressure detection means disposed in said first conveying means between said solenoid means and said hydrogen containing means for supplying a first signal to said solenoid means when the pressure in said first conveying means is greater than a certain level, and for supplying a second signal to said solenoid means when the pressure in said first conveying means is less than said certain level.

4. A hydrogen/hydrocarbon fuel system as in claim 1 wherein said first control means is an electrically actuated solenoid, and wherein said second control means is an electrically operated fuel pump.

5. A hydrogen/hydrocarbon fuel system as in claim 1 wherein said means for containing hydrogen comprises a hydride storage tank for holding a hydride material and for enabling circulating in proximity therewith of a heat exchange medium, said hydride material being adapted to release hydrogen gas when heat is applied thereto, heat exchange means including a housing coupled to an exhaust port through which exhaust gases exit from the combustion unit, and said heat exchange means having an outlet to enable exhaust gases from the combustion unit to flow through the housing and out the outlet, the heat exchange means further including a conduit extending through the housing and having a plurality of baffles disposed on the exterior of the conduit to muffle the exhaust noise of the combustion unit and to absorb heat from the exhaust gases and transfer the heat to said conduit, and means for conveying said heat exchange medium from the hydride storage tank to the conduit where the medium is heated by the exhaust gases, and from the conduit to the hydride storage tank to heat the hydride material to cause release of hydrogen gas.

* * * * *